Aug. 19, 1952 E. J. JOHNSON 2,607,312
AUTOMATIC CLUTCH MECHANISM
Filed April 6, 1949 3 Sheets-Sheet 1

Inventor
ERROLD J. JOHNSON
By Carlsen & Hagle

Aug. 19, 1952  E. J. JOHNSON  2,607,312
AUTOMATIC CLUTCH MECHANISM
Filed April 6, 1949  3 Sheets-Sheet 2
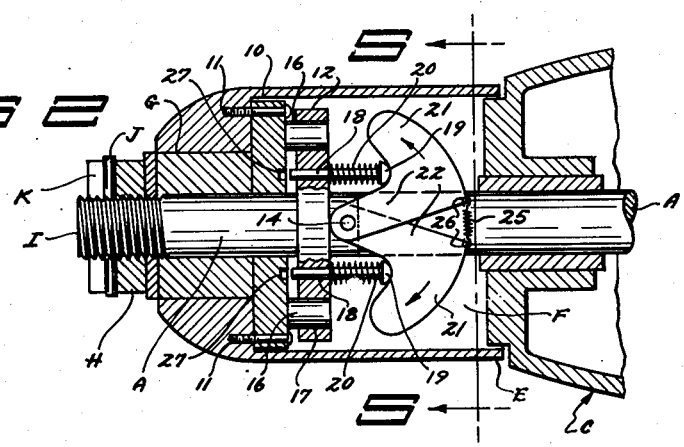
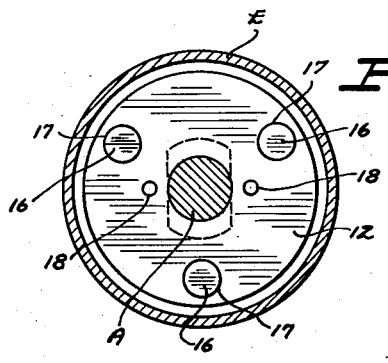
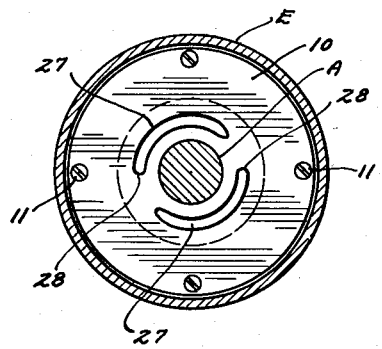
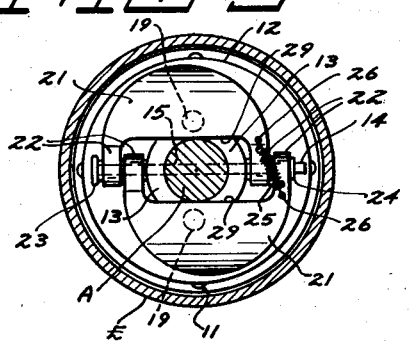
Inventor
ERROLD J. JOHNSON
By Carlsen + Hagle

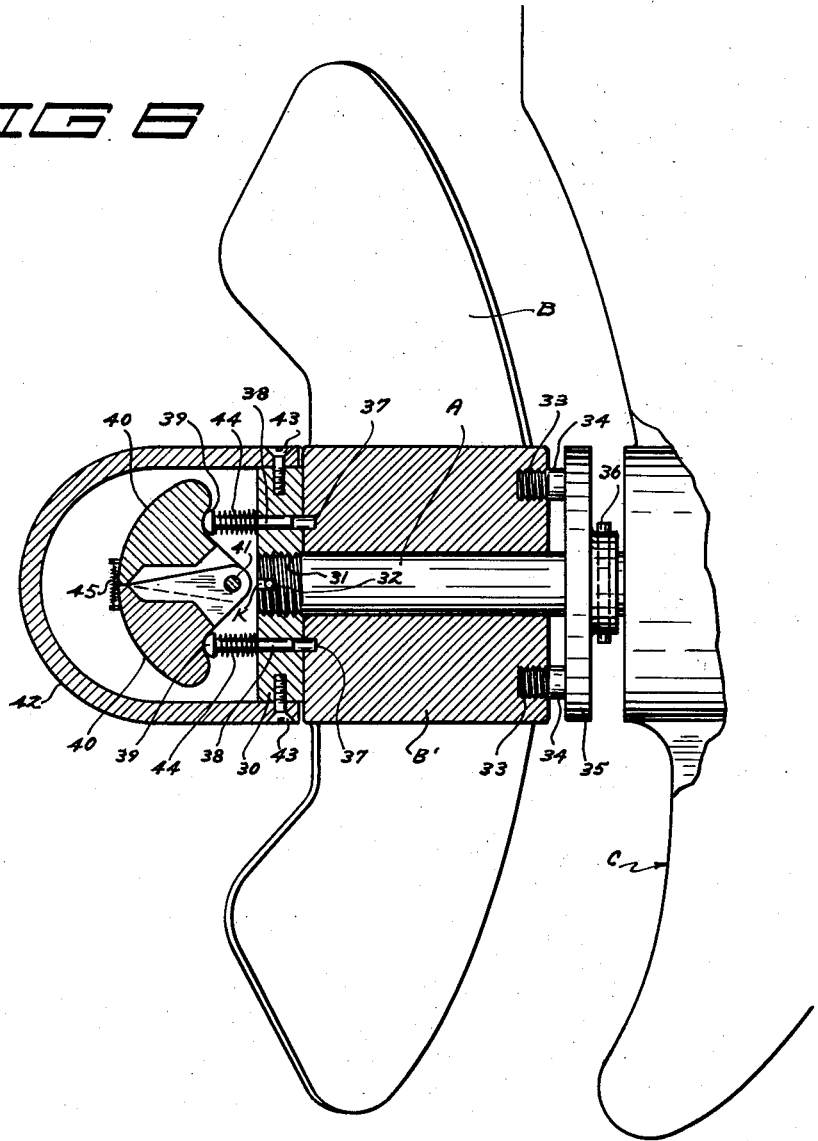

Patented Aug. 19, 1952

2,607,312

UNITED STATES PATENT OFFICE 2,607,312

AUTOMATIC CLUTCH MECHANISM

Errold J. Johnson, Osseo, Minn.

Application April 6, 1949, Serial No. 85,909

6 Claims. (Cl. 115—17)

This invention relates generally to improvements in automatic clutch mechanisms for connecting a power source such as a rotary shaft to an energy absorbing means or load, and transmitting torque therebetween.

The primary object of the invention is to provide a two-stage combination friction clutch or drive mechanism and a centrifugally controlled, speed responsive direct drive mechanism, wherein the power source is connected to the load by the friction drive at relatively low speeds and automatically directly connected to transmit torque with no slippage to the load at higher speeds. As one example of an application for my invention, I herein disclose it as the drive mechanism between an outboard motor and its propeller, although I do not, of course, limit myself to this particular use for my invention. It is well known that the outboard motors now used for sporting purposes give considerable difficulty when operating at the low, so-called trolling speeds, due to the fact that the motors operate best at relatively high speeds. As a matter of fact, this is one of the chief operating difficulties with outboard motors which almost invariably are of the two-cycle type, and which in order to operate to best advantage must run at fairly high speed. The clutch mechanism of my invention, when arranged between the engine driven shaft and the propeller, permits the propeller to slip at comparatively low speeds, and by the proper preselection of the slippage ratio the clutch will enable the motor to run at a medium speed, such as to secure complete combustion and prevent any tendency toward stalling, while permitting the propeller to drive the boat at a very low trolling speed. Then for normal travel or cruising the clutch mechanism will automatically directly connect the motor to the propeller, when the speed of the motor is increased, transmitting torque without slippage and permitting the normal travel speed of the boat to be attained.

Another object of my invention is to provide a clutch mechanism embodying a constantly engaged friction clutch, with provision for adjusting the slippage ratio, and with a direct drive connection which normally is disengaged but is operated by a governor to be automatically engaged when the engine speed is increased beyond a predetermined minimum. It will, of course, be understood that when the direct drive connection is in operation the friction clutch will have no slippage whatsoever so that it will not be subject to wear except when actually in use.

Another important object of my invention, particularly as employed for operating a propeller, is to provide a clutch mechanism by means of which the full operating potentiality of the propeller may be realized. It is common practice in the present day manufacture of outboard motors, with fixed pitch propellers, to adjust the pitch somewhere between minimum and maximum so that the motor will troll at a fairly low rate of speed with the motor operating, in theory at least, at a speed high enough to prevent stalling. This, of course works a disadvantage for cruising or high speed operation, but in accordance with my invention a propeller of maximum useful pitch may be used but by introducing the controlled slippage in the friction drive range of speeds the motor will nevertheless troll at the desired low speed, while the maximum possible speed will be obtained as the automatic direct connection goes into action.

Another object of my invention is to provide an improved automatic friction drive and drive clutch which is simple, inexpensive and practical in construction and which may be made up either as a part of the motor as originally manufactured, or which by minor variation in the structure may be applied to existing motors as an accessory thereto.

These and other more detailed and specific objects will be disclosed in the course of the following specification reference being had to the accompanying drawings, in which—

Fig. 2 is a fragmentary, horizontal sectional view taken substantially along the line 2—2 in Fig. 1.

Figure 1:
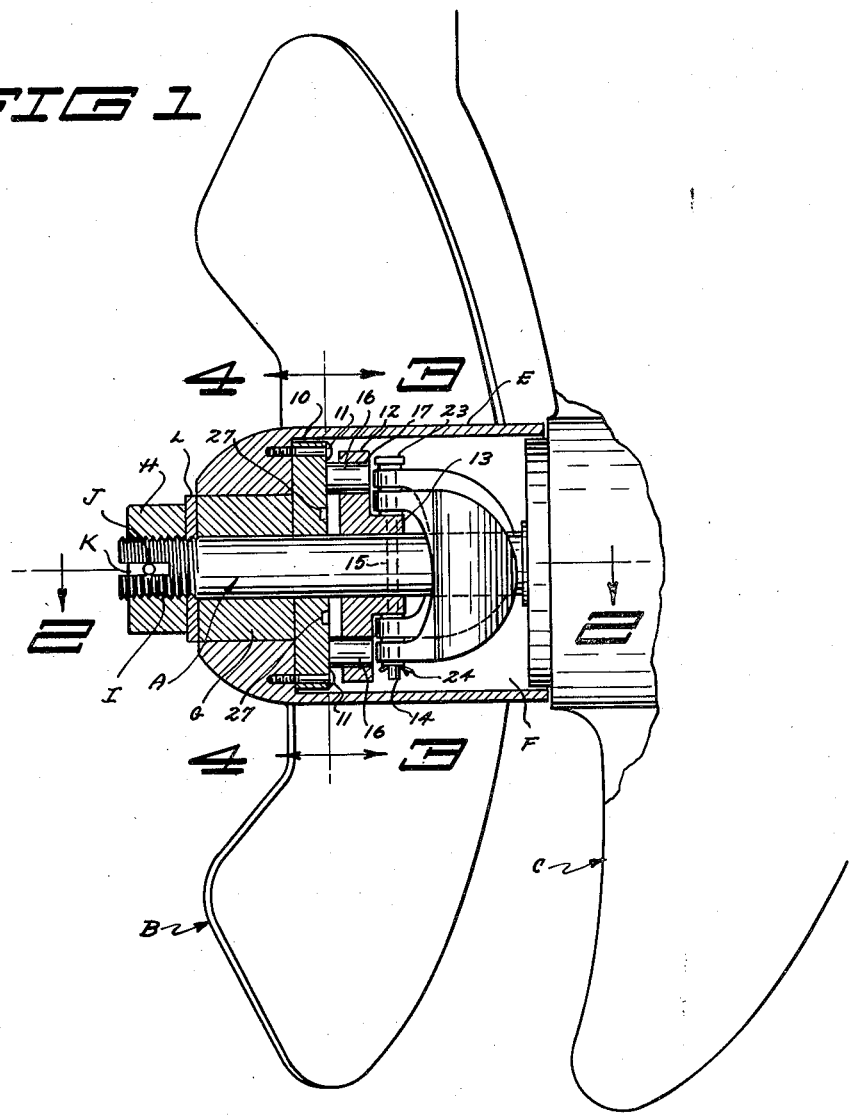
Fig. 1 is a side view of the lower portion of an outboard motor and associated propeller with the hub structure thereof shown in diametrical section and illustrating one embodiment of my improved clutch mechanism.

Figs. 3 and 4 are cross-sectional views through the propeller hub taken respectively along the lines 3—3 and 4—4 in Fig. 1.

Fig. 5 is a similar cross-sectional view, but in this case taken along the line 5—5 in Fig. 2.

Fig. 6 is a view similar to Fig. 1 but showing a modification of the automatic clutch mechanism particularly adapted to installation on present day motors.

Referring now more particularly and by reference characters to the drawing I have indicated a power source in the form of a rotary power operated shaft, designated A throughout the drawing, and which is adapted to drive an energy absorbing means or load, indicated generally at B. As herein shown and described the shaft A is the rearwardly and generally horizontally extending propeller shaft of a conventional outboard motor the lower part of which appears at C, while the load B takes the form of the usual propeller which propels the boat through the water. As stated hereinbefore this showing of the installation upon the outboard motor is for example only, and my combination or two-stage friction and direct drive or clutch may, of course, find other uses, all of which I consider within the scope of my invention.

As seen in Figs. 1 through 5 the clutch mechanism is specifically designed for mounting completely in the hub E of the propeller B and for this purpose the hub has a cylindrical recess or cavity F the rear end of which is open to receive a bushing G by which the propeller is rotatably mounted upon the shaft A. The propeller is held in place by the usual propeller nut H screwed upon the threaded rear end I of the shaft A and this nut is of the castellated type so that it may be locked in any one of a plurality of angularly related positions upon the shaft by means of a lock pin or key J passing through an end slot or kerf K at the rear threaded end of the shaft. This construction and adjustment of the propeller nut is itself well known in the art and requires no further description herein, although it will be referred to later in connection with the action of the friction clutch or drive. The usual washer L is also placed between the nut H and the bushing G as seen in Figs. 1 and 2.

It is thus seen that the propeller D is mounted for rotation independently of the shaft A and torque is transmitted between the shaft and propeller to rotate the latter by a slip clutch or friction drive comprising a circular drive plate 10 which is secured by means of screws 11 to the inner forward surface of the propeller hub E and against the forward end of the bushing G. This drive plate 10 thus is connected to rotate as a unit with the propeller. Located forwardly of the drive plate 10 and nonrotatably mounted upon the shaft A is a clutch plate 12 having a forwardly extending hub portion 13 provided with diametrically opposed openings through which extends a pin 14. The pin 14 passes through a diametrically extending bore 15 in the shaft A and thus locks the clutch plate 12 so that it turns with the shaft A immediately ahead of the drive plate 10. The friction clutch is completed then by a plurality of plugs or buttons 16, preferably three or more in number, which are anchored in openings 17 provided in the clutch plate 12 and which extend from the plate rearwardly into end contact with the drive plate 10. The plugs 16 are of leather or analogous material, so that in bearing upon the forward surface of the drive plate 10 they will frictionally transmit torque thereto in such manner that the shaft A will rotate the propeller B but with a slippage ratio largely determined by the relative pressure between the plugs and the drive plate 10. This pressure may be preselected by the hereinbefore described adjustment of the propeller nut H to any of its several angularly related positions upon the shaft, and such adjustments obviously move the entire hub assembly axially with respect to the clutch plate 12 which itself is fixed to the shaft. The plugs 16 might be mounted in either plate 10 or 12, of course.

As best shown in Figs. 2, 4 and 5 my improved clutch or drive mechanism further includes a speed responsive, direct drive comprising forwardly and rearwardly movable drive pins 18 slidably mounted in diametrically opposed positions through the clutch plate 12, closely adjacent the shaft A. At their forward ends the drive pins 18 have rounded heads 19 and light expansion coil springs 20 are coiled around the forward portion of the pins and braced between these heads and the clutch plate in order normally to bias the pins in a forward direction, to the positions indicated in Fig. 2. Such motion of the drive pins, under influence of the springs 20, is limited by the contact of their heads 19 with the winged portions of governor weights 21 which have overlapping lateral ears 22 apertured to pivotally engage and mount upon the pin 14. In order to hold this assembly together the pin 14 has a head 23 at one end and after the weights are assembled the opposite end is fitted with a cotter key 24. The governor weights 21 are thus pivotally mounted upon the pin 14 but are caused to rotate with the shaft A so that they will swing apart, or open in lateral directions with respect to the shaft under the influence of centrifugal force as will be clearly understood. This motion of the weights 21 is yieldably resisted by at least one coil spring 25, the extremities of which are attached by hooks 26 to the swingable forward ends of the weights in order to pull them inwardly and against the shaft A. The forward motion of the drive pins 18 under influence of the springs 20 also urges their heads 19 against the governor weights to urge them toward this normal position. The rear ends of the drive pins 18 stand forwardly of the forward surface of the drive plate 10 so that they normally will have no effect whatever upon the transmission of torque through the friction clutch mechanism from shaft to propeller. The forward surface of the drive plate 10, however, is provided with arcuate clutching grooves 27 in registry with the rear ends of the drive pins 18 and these grooves 27 are of the type which increase in depth in the direction of rotation of the parts and terminate in closed ends 28 of considerable depth, commonly called blind holes.

In the operation of the mechanism it will first of all be understood that as the motor is started up torque will be transmitted from the shaft A to the propeller B only through the friction clutch and by the buttons 16, with the result that at comparatively low speeds there will be considerable slippage between the propeller and shaft. As the rotational speed of the shaft increases however, the increasing centrifugal forces effective upon the governor weights 21 will overcome the resistance of the springs 20 and 25, and these weights will swing apart, with the result that the drive pins 18 will be thrust rearwardly through the clutch plate 12 and their rear ends will enter the grooves 27. As soon as these ends of the pins 18 reach the closed ends 28 of the grooves a direct drive connection will be established between the shaft A and the propeller since the drive pins will now effectively lock the clutch plate 12 to the drive plate 10. As soon as this direct drive condition is reached, further increases in the rotational speed of the shaft A will, of course, have no further effect on the clutch mechanism but will be transmitted directly to the propeller. It is thus seen that at a certain point during the increase in the speed of the motor driving shaft A the direct drive or direct clutch, which is responsive to this speed, will override the friction clutch and the point at which this override or transition takes place may be readily preselected by properly proportioning the springs, with reference to the weight of the governor weights 21.

In the case of the outboard motor and propeller as here exemplified my mechanism permits the operation of the propeller by the friction clutch while trolling, and due to the slippage between the parts the engine itself may be operated at a speed sufficiently high to secure proper combustion and ignition while the actual propeller speed is such as to propel the boat very slowly. For cruising or normal traveling an increase in the engine speed will cause the centrifugally operated or speed responsive direct drive to override the friction drive causing the speed of the propeller to pick up to maximum as will be clearly apparent. It will be noted that there is slippage between the plugs 16 and drive plate 10 only while the motor is operated for trolling speed so that these parts are subject to wear only when they are actually in use. The amount of slippage may be readily adjusted by turning up or backing off the propeller nut H so that a propeller to motor speed ratio which is found to be most effective for proper operation may be selected. This adjustment of the propeller nut H may also be made as necessary to take up wear in the friction clutch but such adjustments will be very infrequent inasmuch as this wear takes place only while actually trolling with the motor.

As best seen in Fig. 5 the hub 13 of the clutch plate 12 is cut away flat upon opposite sides at 29, in order to clear the drive pins 18 and associated springs 20, and it is, of course, through the intervening rounded portions of the hub that the pin 14 is arranged.

The drive mechanism of my invention is also particularly useful for outboard motors in that it permits the use of a propeller of maximum practical pitch for high speed operation without placing a penalty on the user as regards trolling. This is, of course, due to the fact that for high speed or cruising operation the propeller is directly driven by the motor, whereas for trolling the drive is through the friction clutch only and this may be adjusted readily to compensate for the greater than usual pitch of the propeller.

The structure as thus far described is perhaps best adapted for factory or initial installation on the motor but I also contemplate the modified construction shown in Fig. 6 wherein the propeller B has the usual solid hub B' by which it is mounted upon the motor shaft A. In this case I will substitute for the usual propeller nut a circular plate 30 having a tapped opening 31 to screw on the rear of the shaft A and having the usual pin 32 for locking the plate in any one of several adjusted positions by engaging the slot K. At its forward end the hub B' is provided with tapped sockets 33 into which friction plugs 34 are screwed and the flat forward ends of these plugs operate in frictional engagement with a drive plate 35 pinned upon the shaft A, as indicated at 36. Thus the friction drive for the propeller is located forwardly of, instead of inside, the hub as previously described.

The rear end of the hub B is then provided with arcuate clutching grooves 37 identical to those indicated at 27 heretofore, and cooperating with these grooves are drive pins 38 slidably mounted through the plate 30. The drive pins 38 extend rearwardly from the plate and have rounded heads 39 cooperating with governor weights 40 which are pivotally mounted upon a pin 41. This pin is carried by a rounded cap or housing 42 secured by screw 43 to the plate 30 to rotate with the shaft A so that the rotation thereof beyond a certain speed will cause the weights to swing outward on the pin 41, and by engaging the heads 39, thrust the drive pins 38 forwardly into the grooves 37 to establish the direct drive connected from shaft to propeller. The parts are biased toward normal positions by springs 44 upon the drive pins 38 and by a spring 45 connecting the governor weights 40. The operation of this version of the invention is identical to that previously described herein and no further description should be required. The adjustment for the friction drive in order to take up wear and adjust the slippage ratio is in this case made by turning the plate 30 upon the threaded rear end of the shaft A as will be clearly understood. This modification of my invention is adaptable to installation on the present day motors as an accessory.

My clutch mechanism is not to be confused with the various types of friction drives sometimes used in outboard motors, for the purpose of allowing the propeller to slip when it strikes an obstruction in the water and prevent damage. The friction drive is in operation only when trolling, for the express purpose of allowing the motor to run comparatively fast and the propeller to run slow enough to obtain proper trolling speed.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For connecting an outboard motor drive shaft to a propeller, drive mechanism comprising, a drive plate connected to the propeller, a clutch plate connected to the drive shaft and facing said drive plate, friction plugs secured in one of the plates outwardly of the axis of rotation frictionally engaging the other to transmit torque from shaft to propeller, and a centrifugally actuated means for locking the plates together above a certain shaft speed to transmit the torque independently of the friction plugs.

2. The combination with a motor shaft and a propeller journaled thereon, of a friction clutch connecting the shaft and propeller to transmit torque with slippage such that the propeller will run slower than the shaft, separate parts connected to the shaft and propeller, the part on the propeller having arcuate clutching grooves, drive pins in the part on the shaft and slidable toward and away from said grooves and spring biased to normally move away from the grooves, and governor weights rotatable with the shaft and swingable outwardly with respect thereto as the shaft speed reaches a predetermined value, the said drive pins having ends positioned for direct engagement by the governor weights as they swing outwardly to thrust the pins endwise into said grooves.

3. The combination with a motor shaft and a propeller thereon and said propeller having a hub, of a drive plate secured to the propeller hub, a clutch plate secured to the shaft, friction members on the clutch plate frictionally engaging the drive plate to rotate the propeller, a propeller hub nut threaded on the shaft and adjustable to position the drive plate with reference to the clutch plate and thereby adjust the frictional contact of said members on the drive plate, and a centrifugally operated direct drive clutch for locking the drive and clutch plates to rotate as a unit.

4. The combination with a motor driven shaft and a propeller journaled thereon and said propeller having a hub and a drive plate, of a clutch plate secured to the shaft and the two plates being positioned in facing relation, friction clutch means on the clutch plate frictionally engaging the drive plate to transmit torque from the shaft to the propeller at low speeds, and a centrifugally operated direct drive clutch for locking the plates together at higher speeds, the direct drive clutch comprising weights pivoted to the clutch plate, pins slidable through the clutch plate toward and away from the drive plate, one end of the pins lying in the path of the weights as they are swung outward by centrifugal force, and the drive plate having recesses to receive the other ends of the pins as they are moved toward the drive plate by the weights.

5. The combination with a motor driven shaft and a propeller journaled thereon and said propeller having a hub and a drive plate, of a clutch plate secured to the shaft and the two plates being positioned in facing relation, friction clutch means on the clutch plate frictionally engaging the drive plate to transmit torque from the shaft to the propeller at low speeds, and a centrifugally operated direct drive clutch for locking the plates together at higher speeds, the direct drive clutch comprising weights located at opposite sides of the shaft, a pin fastening the clutch plate to the shaft, the said weights being pivoted on the said pin, clutch pins slidable through the clutch plate toward and away from the drive plate and one end of said pins being positioned for direct engagement by the weights as they swing outward from the shaft to thrust the pins toward the drive plate, and the drive plate having recesses for engagement by the pins.

6. The combination with a motor driven shaft and a propeller journaled thereon and said propeller having a hub and a drive plate, of a clutch plate secured to the shaft and the two plates being positioned in facing relation, friction clutch means on the clutch plate frictionally engaging the drive plate to transmit torque from the shaft to the propeller at low speeds, the clutch plate having a hub and a pin securing the hub to the shaft, weights pivoted on the pin and adapted to swing outward from the shaft at higher speeds thereof, clutch pins slidable through the clutch plate toward and away from the drive plate and having headed ends for engagement by the outwardly swinging weights to move the pins toward said drive plate, the drive plate having recesses to engage the pins, and the said hub being flattened on opposite sides to clear the weights.

ERROLD J. JOHNSON.

REFERENCES CITED

The following references are of record in the file of this patent:

UNITED STATES PATENTS

| Number | Name | Date |
|---|---|---|
| 1,730,890 | Kaisser | Oct. 8, 1929 |
| 2,258,393 | Simmonds | Oct. 7, 1941 |
| 2,348,716 | Banker | May 16, 1944 |

FOREIGN PATENTS

| Number | Country | Date |
|---|---|---|
| 7,318 | France | May 3, 1907 |
| 30,752 | Sweden | Dec. 6, 1909 |
| 706,664 | France | Mar. 31, 1931 |
| 851,130 | France | Mar. 3, 1939 |